United States Patent [19]

Harris et al.

[11] Patent Number: 5,395,918
[45] Date of Patent: Mar. 7, 1995

[54] ORGANO-SOLUBLE POLYIMIDES FROM SUBSTITUTED DIANHYDRIDES

[75] Inventors: Frank W. Harris; Sheng-Hsien Lin, both of Akron, Ohio

[73] Assignee: The University of Akron, Akron, Ohio

[21] Appl. No.: 230,636

[22] Filed: Apr. 21, 1994

[51] Int. Cl.⁶ .............................................. C08G 69/26
[52] U.S. Cl. .................................... 528/353; 528/125; 528/126; 528/128; 528/172; 528/173; 528/174; 528/176; 528/188; 528/220; 528/229; 528/350; 528/351; 562/465; 562/466
[58] Field of Search .............. 528/353, 125, 126, 128, 528/172, 173, 174, 176, 188, 220, 229, 350, 351; 562/465, 466

[56] References Cited

U.S. PATENT DOCUMENTS

| | | | |
|---|---|---|---|
| 4,239,880 | 12/1980 | Darms | 528/125 |
| 4,271,288 | 6/1981 | Woo | 528/353 |
| 4,421,929 | 12/1983 | Woo | 562/465 |
| 4,485,140 | 11/1984 | Gannett et al. | 428/260 |
| 5,071,997 | 12/1991 | Harris | 528/353 |
| 5,147,966 | 9/1992 | St. Clair et al. | 528/188 |
| 5,175,242 | 12/1992 | Harris | 528/353 |
| 5,178,964 | 1/1993 | Scola et al. | 428/473.5 |

OTHER PUBLICATIONS

Mark W. Beltz "Synthesis of Aromatic Polyimides Containing Oxyalkylene Linkages" 1987–1988.

*Primary Examiner*—John Kight, III
*Assistant Examiner*—Terressa M. Mosley
*Attorney, Agent, or Firm*—Oldham, Oldham & Wilson

[57] ABSTRACT

The invention describes new biphenyl dianhydrides, and new polyimides and copolyimides made from the dianhydrides. The synthesized polyimides exhibit significantly enhanced solubility when the biphenyl dianhydrides are substituted, particularly at the 2 and 2' positions on the phenyl rings.

18 Claims, No Drawings

ORGANO-SOLUBLE POLYIMIDES FROM SUBSTITUTED DIANHYDRIDES

TECHNICAL FIELD

The invention described herein pertains generally to new biphenyl dianhydrides, and new polyimides and copolyimides made from the dianhydrides. The synthesized polyimides exhibit significantly enhanced solubility when the dianhydrides are substituted, particularly at the 2 and 2' positions.

BACKGROUND OF THE INVENTION

Polyimides arc useful as components which require excellent thermal, electrical and/or mechanical properties. For general discussion of polyimides preparation, characterization and applications see *Polyimides, Synthesis, Characterization and Applications*, K. L. Mittal, ed Plenum, N.Y. 1984.

Polyimides based on pyromellitic dianhydride and various organic diamines are disclosed in U.S. Pat. No. 4,485,140 to Gannett et al (E. I. DuPont de Nemours and Co.).

Polyimides based on diamines such as 2,2'-di-(p-aminophenyloxy)diphenyl and various dianhydrides are disclosed in U.S. Pat. No. 4,239,880 to Danns (Ciba-Geigy Co.).

Harris et al. in U.S. patent application 07/315,327, has disclosed the preparation of soluble polyimides based on polyphenylated diamines. The polyimides taught in this reference are typically rod like polyimides and possess little if any thermoplastic properties.

None of the above patents teaches the increased solubility of resultant polyimides which are derived from substituted biphenyl dianhydrides.

SUMMARY OF THE INVENTION

In accordance with the present invention, there is provided a new class of polyimides and polyimide compositions that can be prepared from a new class of substituted biphenyl dianhydrides, which can be combined with monoaromatic and polyaromatic diamines to form homopolyimides and copolyimides.

It is an object of this invention to provide novel polyimides based on a new class of substituted biphenyl dianhydrides.

A further object of this invention is to provide novel polyimides based on the new biphenyl dianhydrides and a diamine or polymerizable equivalent thereof.

A further aspect of this invention is to provide novel copolyimides comprising repeat units based on the new biphenyl dianhydrides and one or more diamines.

A further aspect of this invention is to provide a more soluble polyimide by substitution on the phenyl rings of the dianhydride, particularly when the substitution occurs in the 2 and 2' positions.

These and other objects of this invention will be evident when viewed in light of the detailed description and appended claims.

DETAILED DESCRIPTION OF THE INVENTION

Referring now to the drawings wherein the showings are for purposes of illustrating the preferred embodiment of the invention only and not for purposes of limiting the same, the Figures show that the homopolyimides of the invention consist of combinations of: (1) tetracarboxylic acid dianhydrides substituted in the 2 and 2' positions as shown in formula (IV):

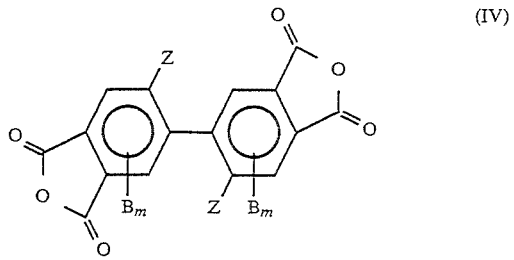

wherein each B and Z are selected independently from the group consisting of halogen, viz. fluoride, chloride, iodide and bromide, $C_{1-3}$ alkyls, $C_{1-3}$ halogenated alkyls, phenyls or substituted phenyls wherein the substituents on the phenyl ting include halogens, $C_{1-3}$ alkyls, $C_{1-3}$ halogenated alkyls and combinations thereof; m is an integer from 0 to 2; and (2) monoaromatic and polyaromatic diamines of formula (III):

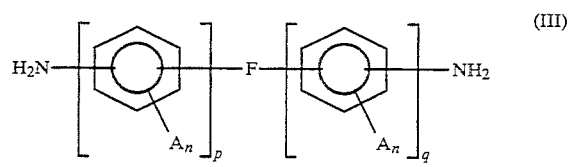

where F is selected from the representative and illustrative group consisting of a covalent bond or linking bond, a $CH_2$ group, a $C(CH_3)_2$ group, a $C(CF_3)_2$ group, a $C(CX_3)_2$ group wherein X is a halogen, a CO group, an O atom, a S atom, a $SO_2$ group, a $Si(CH_2CH_3)$ group or $N(CH_3)$ group; each A is selected independently from the group consisting of hydrogen, halogen, viz. fluoride, chloride, iodide and bromide; alkyl, substituted-alkyl such as halogenated alkyls, nitro, cyano, thioalkyl, alkoxy, aryl or substituted-aryl such as halogenated aryls, alkyl esters and substituted alkyl esters and combinations thereof; n is an integer from 0 to 4; and p and q are integers from 0 to 3 and 1 to 3 respectively, and wherein when p and q are greater than 1, the linking group between benzyl or substituted benzyl groups is F.

Copolyimides are also a component of this invention and consist of combinations of at least one biphenyl dianhydride of formula (IV) with at least one other benzene dianhydride, such as pyromellitic dianhydride and substituted pyromellitic dianhydrides of general formula (I):

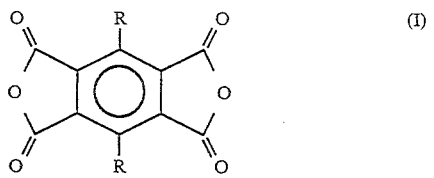

and/or tetracarboxylic acid dianhydrides of formula (II);

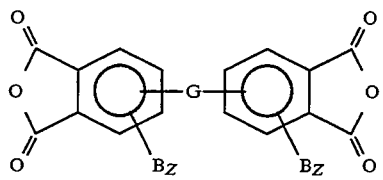

with monoaromatic and polyaromatic diamines of formula (III);

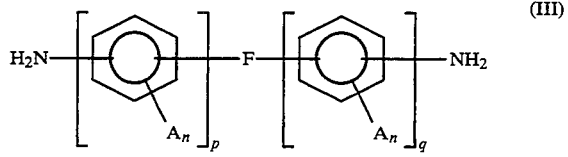

wherein each R is a substituent substituent selected independently from the group consisting of H, phenyl, alkyl, halogenated alkyl, and substituted phenyl wherein the substituents on the phenyl ring include halogens, $C_{1-3}$ alkyls, $C_{1-3}$ halogenated alkyls and combinations thereof from 1 to 20 carbons, z is an integer from 0 to 3, and G, F, $A_n$, p and q are as previously defined.

Thus, it is understood that this invention envisions homopolymers made from biphenyl acid dianhydrides substituted in the 2 and 2' positions as shown in formula (IV) and diamines of formula (III) in which case p must be at least 1 to insure solubility, and as shown in generic form by formula (V).

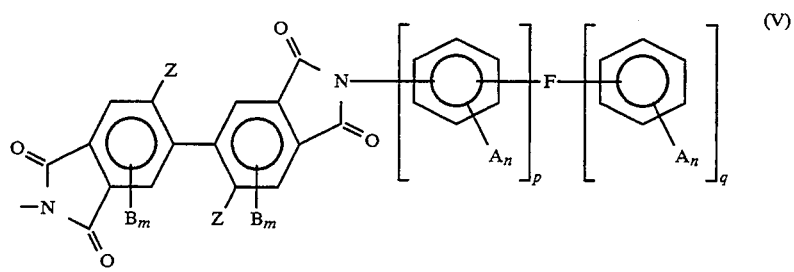

It is additionally understood that the term copolyimides as used in this application and the claims is not limited to polyimides containing only two different repeat units, but is intended to include any polyimide having two or more different repeat units. Thus, a copolyimide of the present invention can be made: (1) (a) with a substituted acid dianhydride of formula (IV) with at least two diamines of formula (III) or (b) at least two substituted acid dianhydrides of formula (IV) and a diamine of formula (III) and shown in generic form by formula (VI); or

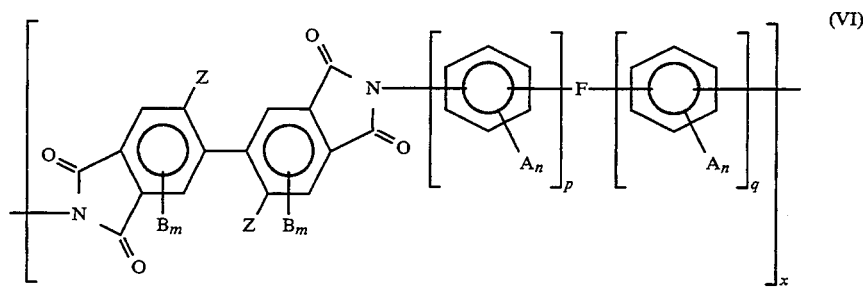

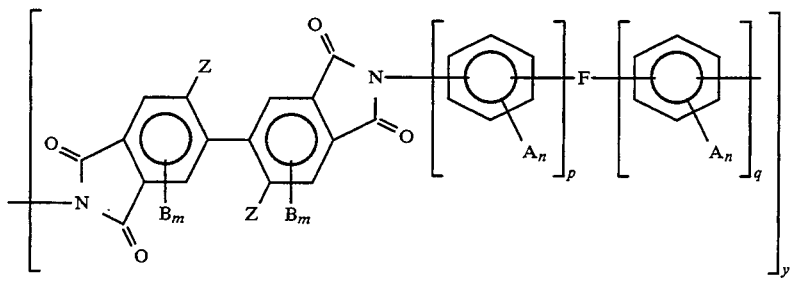

(2) with a diamine of formula (III) and two or more organic dianhydrides of formulas (I) and (IV), or any combination thereof and shown in generic form by formula (VII); or

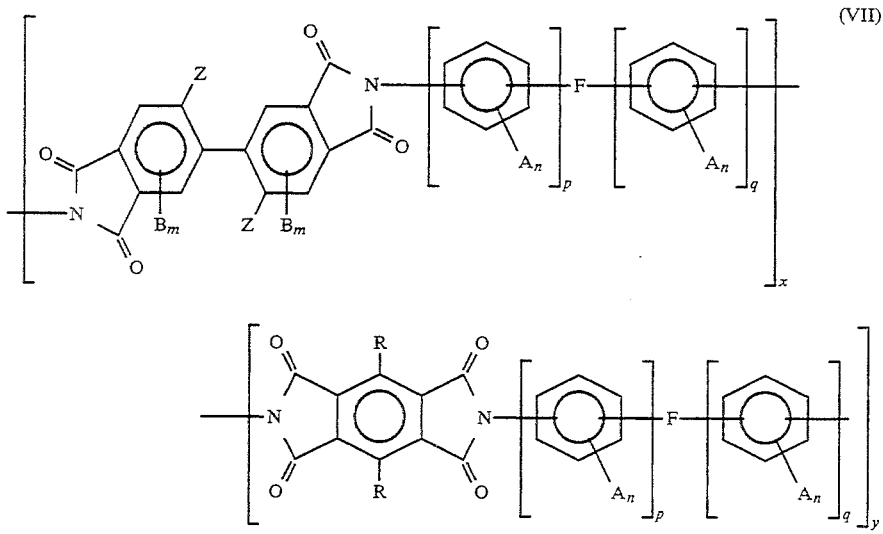

(3) with a diamine of formula (III) and two or more organic dianhydrides of formulas (II) and (IV), or any combination thereof and shown in generic form by formula (VIII)

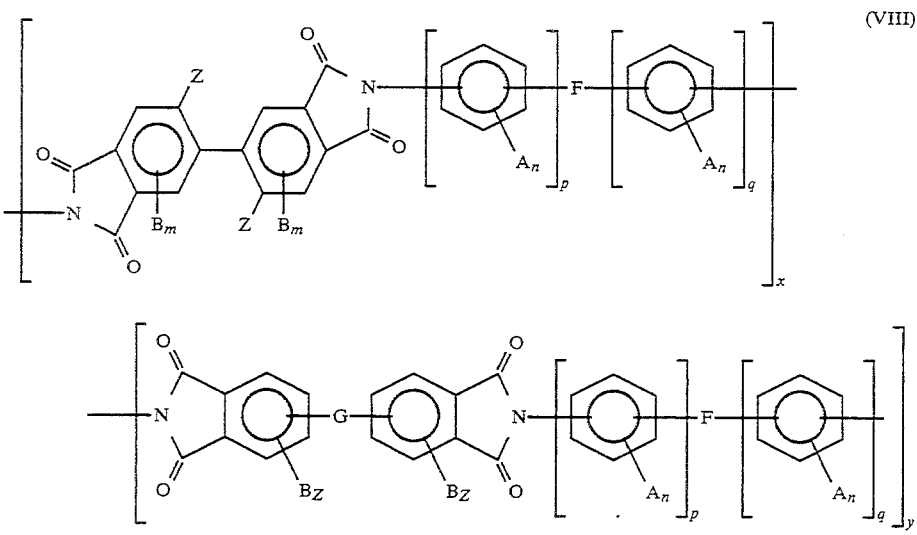

It is appreciated that the relationship between x and y is inverse and that as x varies from 100 to 0, y correspondingly varies from 0 to 100.

Although the above polyimides and copolyimides as described do not have end groups or indicate what end groups are present, end groups are present and the nature of the end groups are controlled by the reaction conditions or are determined by the addition of capping reagents. Thus, the end groups can be either an amino group or an anhydride group or a combination thereof depending on the exact molecular composition of the starting reagents as well as the course of a random condensation polymerization.

If a diamine of formula (III) is used in slight excess from about 1 to 10 mole percent relative to a dianhydride of formulas (I or II or IV), then the resulting polyimides will predominately be amino terminated, and the end groups of the polymer will be unreacted amino groups. On the other hand, if dianhydrides of formulas (I or II or IV) are used in slight excess from about 1 to 10 mole percent relative to a diamine of formula (III), then the resulting polyimides will predominately be anhydride terminated, and the end groups of the polymer will be unreacted anhydride groups. However, circumstances could arise wherein the polyimides would be terminated by one amino group and one anhydride or acid group. In an analogous fashion, copolyimides of the present invention can be terminated with anhydride groups, amino groups or some mixture thereof, depending on the exact polymerization conditions and molar ratios of the reacting diamines and dianhydrides.

In certain cases, a terminating agent can be employed to force the termination of a growing polyimide or copolyimide. These agents are often used to control the molecular weight of the polymer by reducing the ultimate length of the polymer chains and/or to impart desired functionality to the end of the polymer chain. These agents can be either simple anhydrides or simple amines or reactants reactive therewith. Because these agents are preferably mono-functional, they will cause the growing polymer chain to be capped with the particular agents employed. Anhydrides which are useful as capping agents are selected from the representative and illustrative group consisting of aromatic anhydrides such as phthalic anhydride. Amines which are useful as capping agents are selected from the representative and illustrative group consisting of aromatic amines such as aniline, methyl anilines, dimethyl anilines or naphthylamines.

Representative and illustrative examples of these useful anhydrides in the copolyimide invention are pyromellitic dianhydride, 3,6-diphenylpyromellitic dianhydride, 3,6-bis(trifluoromethyl)pyromellitic dianhydride, 3,6-bis(methyl)pyromellitic dianhydride, 3,6-diiodopyromellitic dianhydride, 3,6-dibromopyromellitic dianhydride, 3,6-dichloropyromellitic dianhydride, 3,3',4,4'-benzophenonetetracarboxylic acid dianhydride, 2,3,3',4'-benzophenonetetracarboxylic acid dianhydride, 2,2',3,3'-benzophenone tetracarboxylic acid dianhydride, 3,3',4,4'-biphenyltetracarboxylic acid dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)propane dianhydride, 2,2-bis(3,4-dicarboxyphenyl)- 1,1,1,3,3,3-hexafluoropropane dianhydride, bis(3,4-dicarboxyphenyl)ether dianhydride (4,4'-oxydiphthalic anhydride), bis(3,4-dicarboxyphenyl)sulfone dianhydride (3,3',4,4'-diphenylsulfonetetracarboxylic dianhydride), 4,4'-[4,4'-isopropylidene-di(p-phenyleneoxy)]bis(phthalic anhydride), N,N-(3,4-dicarboxyphenyl)-N-methylamine dianhydride, bis(3,4-dicarboxyphenyl)diethylsilane dianhydride; naphthalene tetracarboxylic acid dianhydrides such as 2,3,6,7- and 1,2,5,6-naphthalene-tetracarboxylic acid dianhydride, 2,6-dichloronaphthalene-1,4,5,8-tetracarboxylic acid dianhydride; or heterocyclic aromatic tetracarboxylic acid dianhydrides such as thiophene-2,3,4,5-tetracarboxylic acid dianhydride, pyrazine-2,3,5,6-tetracarboxylic acid dianhydride and pyridine-2,3,5,6-tetracarboxylic acid dianhydride.

Especially preferred dianhydrides for the homopolymer invention would include 2,2'-substituted dianhydrides such as 2,2'-dibromo-4,4',5,5'-biphenyltetracarboxylic dianhydride, 2,2'-dichloro-4,4',5,5'-biphenyltetracarboxylic dianhydride, 2,2'-diphenyl-4,4',5,5'-biphenyltetracarboxylic dianhydride and the 2,2'-trihalo substituted dianhydrides, particularly 2,2'-bis(trifluoromethyl)-4,4'-5,5'-biphenyltetracarboxylic dianhydride.

And in general, diamines are selected from the representative and illustrative group consisting of benzene diamines such as o-, m- and p-phenylenediamine, 2,4-diaminotoluene, 1,4-diamino-2-methoxybenzene, 1,4-diamino-2-phenylbenzene and 1,3-diamino-4-chlorobenzene. Other useful polyaromatic diamines in the invention would include 4,4'-diaminobiphenyl, 4,4'-diaminodiphenylmethane, 2,2-bis(4-aminophenyl)propane, 2,2-bis(4-aminophenyl)- 1,1,1,3,3,3-hexafluoropropane, 4,4'-diaminodiphenyl ether, 3,4'-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3-hexafluoropropane, 4,4'-diaminodiphenyl thioether, 4,4'-diaminodiphenyl sulfone, 2,2'-diaminobenzophenone, and 3,3'-diaminobenzophenone; naphthalene diamines such as 1,8- and 1,5-diminonaphthalene; or heterocyclic aromatic diamines such as 2,6-diaminopyridine, 2,4-diaminopyrimidine, and 2,4-diamino-s-triazine.

Especially useful are diamines of general formula (IX),

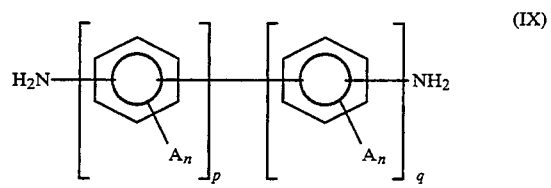

and wherein p and q are 1, and A is preferably selected from the group consisting of $CH_3$, $CF_3$, halogen, CN, and esters wherein the carboalkoxy group is as defined previously and n is at least 1. An exemplary list of non-limiting examples would include 2,2'-bis(trifluoromethyl)-4,4'-diaminobiphenyl, 2,2'-dibromo-4,4'-diaminobiphenyl, 2,2'-dicyano-4,4'-diaminobiphenyl, 2,2'-dichloro-6,6'-dimethyl-4,4'-diaminobiphenyl, 2,2'-dimethyl-4,4'-diaminobiphenyl, 3,3'-dimethyl-4,4'-diaminobiphenyl, 2,2'-dicarboalkoxy-4,4'-diaminobiphenyl and 2,2'-dicarboalkoxy-6,6'-dimethyl-4,4'-diaminobiphenyl.

EXAMPLES

The best mode for carrying out the invention will now be described for the purposes of illustrating the best mode known to the applicant at the time. The examples are illustrative only and not meant to limit the invention, as measured by the scope and spirit of the claims.

EXAMPLE 1

This example illustrates the preparation of 2,2'-dibromo-4,4',5,5'-biphenyl tetracarboxylic dianhydride (DBBPDA).

3,3',4,4'-biphenyltetracarboxylic dianhydride (BPDA) (20.00 g, 0.068 mol) were dissolved in a solution of 10.88 g (0.272 mol) of NaOH in 150 ml of water in a three-necked, 500 ml, round-bottomed flask fitted with a magnetic stirring bar, a condenser, and an addition funnel. Bromination was carried out in five steps. In the first step, 1.50 ml of bromine was slowly added to the solution at 50° C. After the addition was complete, the solution was heated at 90° C. until most of the bromine had reacted. The mixture was cooled to room temperature and neutralized with an aqueous soldium hydroxide solution to a pH of 7.0. For the second, third, and fourth steps, 2.00 ml of bromine was used according to the procedure described previously. 2.5 ml of bromine was used in the fifth step, and added at 50° C. The solution was heated to 90° C. and maintained at that temperature overnight. After the mixture was cooled to room temperature, the precipitate was collected and acidified with concentrated HCl to a pH=2.0. The white precipitate was collected, dried and heated overnight at 200° C. under vacuum. The material was sublimed at 240° C. and recrystallized from a mixture of toluene and dioxane by boiling in toluene and adding dioxane to clearness to obtain 6.08 g (20%) of DBBPDA.

Product properties: mp=249°–251° C.; $^1$H-NMR (DMSO-$d_6$) δ8.15 (s, 2H, aromatic), 8.64 ppm (S, 2H, aromatic); IR (KBr) 1841, 1779 (anhydride), and 597 cm$^{-1}$ (C-Br); Calculated $C_{16}H_4Br_2O_6$: C-42.51%, H-0.89%; Analyzed C-42.04%, H-0.96%.

EXAMPLE 2

This example illustrates the preparation of 4-trifluoromethyl-5-nitro-1,2-dimethylbenzene.

A mixture of 50.00 g (0.18 mol) of 4-iodo-5-nitro-1,2-dimethylbenzene, 98.00 g (0.72 mol) of sodium trifluoroacetate, 75.00 g (0.39 mol) of CuI, 400 ml of DMF, and 80 ml of toluene were added to a three-necked, 1 liter, round-bottomed flask fitted with a nitrogen inlet pipet, a Dean-Stark trap, and a mechanical stirrer. The mixture was heated to 130° C. under nitrogen. After 75 ml of toluene was removed from the Dean-Stark trap, the temperature of the oil bath was then increased to 170° C. and kept at this temperature for 6 hr. After the mixture cooled to room temperature, it was poured into an excess of water and the precipitate collected and extracted with ether. After the solvent was removed, 35 g of crude dark brown liquid was obtained and directly used for the next reduction step without further purification.

Product properties: $^1$H-NMR (CDCl$_3$) $\delta$7.66 (s, 1H, aromatic), 7.53 (s, 1H, aromatic), 2.36 ppm (s, 6H, CH$_3$); IR (neat) 1522, 1347 (NO$_2$), 1151 and 1136 cm$^{-1}$(CF$_3$); Calculated C$_9$H$_8$F$_3$NO$_2$: C-49,32%, H-3.68%; Analyzed C-49.60%, H-3.82%.

EXAMPLE 3

This example illustrates the preparation of 4-trifluoromethyl-5-amino-1,2-dimethylbenzene.

A mixture of 35.0 g of crude 4-trifluoromethyl-5-nitro-1,2-dimethylbenzene, 4.50 g of activated carbon, 0.20 g of FeCl$_3$o6H$_2$O, and 100 ml of methanol was heated at reflux for 15 min. Hydrazine monohydrate (11.7 ml, 12.07 g, 24 mmol) was then added dropwise over 1 hr. The mixture was kept at reflux overnight. After the mixture cooled to room temperature, the carbon black was removed by filtration. After the solvent was removed, the dark brown liquid was distilled under vacuum to give the named compound.

Product properties: $^1$H-NMR (CDCl$_3$) $\delta$7.14 (s, 1H, aromatic), 6.53 (s, 1H, aromatic), 3.69 (s, 2H, NH$_2$), 2.17 (s, 3H, CH$_3$), 2,12 ppm (s, 3H, CH$_3$); IR (neat) 502, 3407 (NH$_2$), 1277, 1154, 1124 and 1109 cm$^{-1}$ (CF$_3$).

EXAMPLE 4

This example illustrates the preparation of 4-trifluoromethyl-5-iodo-1,2-dimethylbenzene.

4-trifluoromethyl-5-amino-1,2-dimethylbenzene (34.02 g, 0.18 mol) was dissolved in a warm mixture of 100 ml of concentrated HCl and 100 ml of water. After the solution was cooled to 0° C., a cooled solution of 12.74 g (0.18 mol) of sodium nitrite in 30 ml of water was added dropwise so that the solution remained below 10° C. The insoluble material was removed by filtration to give a clear diazonium salt solution which was then added dropwise to a solution of 40.00 g (0.24 mol) of potassium iodide in 400 ml of water at 10° C. The mixture was stirred for 30 min. and then warmed to room temperature. The precipitate was collected and recrystallized from ethanol/water by dissolving in ethanol and adding water to cloudiness to obtain the product in 70% yield, with a melting point of 51°-53° C.

Product properties: $^1$H-NMR (CDCl$_3$) $\delta$7.75 (s, 1H, aromatic), 7.36 (s, 1H, aromatic), 2.23 ppm (s, 6H, CH$_3$); IR (KBr) 1298, 1151, 1121 and 1106 cm$^{-1}$(CF$_3$); Calculated C$_9$H$_8$F$_3$I: C-36.03%, H-2.69%; Analyzed 35.98%, H-2.72%.

EXAMPLE 5

This example illustrates the preparation of 2,2'-bis(trifluoro)-4,4',5,5'-tetramethylbiphenyl.

A mixture of 30.00 g (0.10 mol) of 4-trifluoromethyl-5-iodo-1,2-dimethylbenzene, 25.00 g of activated copper, and 85 ml of DMF was heated at reflux for 36 hrs. After cooling to room temperature, the mixture was filtered to remove copper. The filtrate was poured into an excess amount of water and the precipitate collected and recrystallized from ethanol in 73% yield with a melting point of 114°-116° C.

Product properties: $^1$H-NMR (CDCl$_3$) $\delta$7.00 (s, 2H, aromatic), 7.45 (s, 2H, aromatic), 2,33 (s, 6H, CH$_3$), 2.29 ppm (s, 6H, CH$_3$); IR (KBr) 1258, 1164, 1146 and 1131 cm$^{-1}$ (CF$_3$); Calculated C$_{18}$H$_{16}$F$_6$: C-62.43%, H-4.66%; Analyzed C-62.53%, H-4.74%.

EXAMPLE 6

This example illustrates the preparation of 2,2'-bis(trifluoro)-4,4',5,5'-biphenyltetracarboxylic dianhydride (TFBPDA).

A solution of 6.92 g (0.02 mol) of 2,2'-bis(trifluoro)-4,4',5,5'-tetramethylbiphenyl, 240 ml of pyridine, and 40 ml of water were added to a three-necked, 500 ml, round-bottomed flask fitted with a mechanical stirrer and a condenser. The solution was heated to 90° C. Potassium permanganate (28.44 g, 0.180 mol) was added in several portions. Each portion was added after no purple color was observed in the solution. After the mixture was stirred at 90° C. for 6 hr., the hot mixture was then filtered to remove MnO$_2$. The MnO$_2$ was washed with hot water several times. The solvents of the combined filtrate were removed under reduced pressure to give a white residue which was dissolved in a solution of 8.00 g of NaOH in 200 ml of water. Potassium permanganate (13.60 g, 0.086 mol) was added to the solution at 90° C. After the mixture was refluxed for 8 hrs, the excess potassium permanganate was destroyed by adding ethanol to the mixture. The MnO$_2$ was removed from the hot mixture by filtration and washed with hot water. The combined flitrate was concentrated to 80 ml and acidified to pH=2.0 with concentrated HCl. The white precipitate was collected and dried to give 2,2'-bis(trifluoro)-4,4',5,5'-biphenyltetracarboxylic acid which was then heated to 200° C. in a flask under vacuum overnight and finally sublimed at 240° C. to give a white powder.

Product properties: mp=209°-211° C. (toluene), $^1$H-NMR (acetone -d$_6$) $\delta$8.66 (S, 2H, aromatic), 8.29 ppm (s, 2H, aromatic); IR (KBr) 1860, 1797 (anhyride), 1251, 1171, 1146 and 1126 cm$^{-1}$ (CF$_3$); Calculated C$_{18}$H$_4$F$_6$O$_6$ C-50.25%, H-0.94%; Analyzed C-49.93%, H-0.91%.

EXAMPLE 7

This example illustrates the preparation of tetra(n-butyl)2,2'-dibromo-4,4',5,5'-biphenyltetracarboxylate.

A mixture of 13.81 g (0.03 mol) of 2,2'-dibromo-4,4',5,5'-biphenyltetracarboxylic dianhydride, 80 ml. of n-butanol, 70 ml. of toluene, 1.5 ml. of concentrated H$_2$SO$_4$ were added into a on-necked, 300 ml. round-bottomed flask fitted with a Dean-Start trap. The mixture was heated at reflux conditions overnight. After the solution was cooled, washed with water, and separated from the water, the solvents were removed to give 21.70 g (99%) of a colorless, viscous liquid.

Product properties: IR(neat) 1731 (C=O) and 1285 cm$^{-1}$ (C—O); $^1$H-NMR (CDCl$_3$) δ7.96 (s, 2H, aromatic) 7.56 (s, 2H, aromatic), 4.35-4.24 (m, 8H, —COO— $\overline{CH_2}$—CH$_2$—CH$_2$—CH$_3$), 1.75-1.64 (m, 8H,—COO—CH$_2$—$\overline{CH_2}$—CH$_2$—CH$_3$), 1.50-1.35 (m, 8H,—COO—CH$_2$—CH$_2$—$\overline{CH_2}$—CH$_3$), and 0.98-0.87 ppm (m, 12H, —COO—CH$_2$—CH$_2$—CH$_2$—$\overline{CH_3}$).

EXAMPLE 8

To a 100 ml., 3-necked, round-bottomed flask equipped with a nitrogen inlet tube, an addition funnel and a condenser, 3.56 g (5.00 millimoles) of the dibromo tetraester of Example 7, 40 ml. of toluene, 10 ml of 2M Na$_2$CO$_3$ (0.02 moles) and 0.35 g (0.30 millimoles) of Pd(PPh$_3$)$_4$ were added under nitrogen. The mixture was vigorously stirred for 20 minutes under nitrogen, followed by the addition of a solution of 1.82 g (15.00 millimoles) of phenylboric acid in 8 ml. of ethanol under nitrogen. The mixture was heated to reflux for 24 hours under nitrogen. After the mixture was cooled to room temperature, 2.5 ml. of 30% H$_2$O$_2$ was carefully added and the mixture stirred for 1 hr. The mixture was filtered to remove insoluble materials, and the organic layer of the filtrate separated from the aqueous layer, and washed several times with water. The solvents were removed to obtain 3.07 g (87%) of a brown viscous liquid.

Product properties: IR(neat) 1726 (C=O), 1288 and 1242 cm$^{-1}$ (C—O); $^1$H-NMR (CDCl$_3$) δ7.83 (s, 2H, aromatic), 7.46 (s, 2H, aromatic), 2.13 (t, 2H, aromatic), 7.00 (t, 4H, aromatic), 6.51 (d, 4H, aromatic), 4.36-4.26 (m, 8H,—COO—$\overline{CH_2}$—CH$_2$—CH$_2$—CH$_3$), 1.76-1.66 (m, 8H,—COO—CH$_2$—$\overline{CH_2}$—CH$_2$—CH$_3$), 1.48-1.34 (m, 8H, —COO—CH$_2$—CH$_2$—$\overline{CH_2}$—CH$_3$), and 0.99-0.89 ppm (m, 12H,—COO—CH$_2$—CH$_2$—CH$_2$—$\overline{CH_3}$).

EXAMPLE 9

Preparation of 2,2'-diphenyl-4,4',5,5'-biphenyltetracarboxylic dianhydride.

The brown liquid of Example 8 was dissolved in 45 ml. of ethanol in a 100 ml. flask with 3.40 g of KOH. The solution was heated to reflux for 3 hours. The white precipitate was collected by flitration, dissolved in water and acidified with concentrated HCl to a pH=1.0. The white precipitate was collected by filtration and dried at 200° C. overnight, followed by sublimation at 270° C. under vacuum to obtain 1.74 g (90%) of a light yellow powder which was then recrystallized from acetic acid/acetic anhydride to give a colorless crystal.

Product properties: mp=274°-276° C.; IR (KBr) 1842 and 1780 cm$^{-1}$ (anhydride); $^1$H-NMR (DMSO) δ8.34 (s, 2H, aromatic), 7.80 (s, 2H, aromatic), 7.24 (t, 2H, aromatic), 7.07 (t, 4H, aromatic), and 6.54 ppm (d, 4H, aromatic).

Analytical composition: calculated for C$_{28}$H$_{14}$O$_6$ (75.33%- C, 3.16%- H), and (74.88%-C, 3.40%-H) found.

EXAMPLE 10

This example illustrates the preparation of a homopolyimide of 2,2'-dibromo-4,4',5,5'-biphenyltetracarboxylic dianhydride (DBBPDA) and 2,2'-bis(trifluoromethyl)-4,4'-diaminobiphenyl (TFMB).

1.70 millimoles of DBBPDA was added to a stirred solution of 1.70 millimoles of TFMB in 13.1 g of m-cresol (solid content 10% weight per weight of solvent) containing 0.07 g of isoquinoline (optional) under N$_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 10 ml of m-cresol and then slowly added to 1 liter of vigorously stirred 95% ethanol, and dried under reduced pressure at 150° C. for 24 hours.

Polymer properties: [η] at 30.0° C. in NMP=3.40 dl/g; T$_g$ (TMA)=330° C.; CTE=1.34×10$^{-5}$ 1/° C.

EXAMPLE 11

This example illustrates the preparation of a homopolyimide of 2,2'-bis(trifluoromethyl)-4,4',5,5'-biphenyltetracarboxylic dianhydride (TFBPDA) and 2,2'-bis(trifluoromethyl)-4,4'-diaminobiphenyl (TFMB).

1.70 millimoles of TFBPDA was added to a stirred solution of 1.70 millimoles of TFMB in 12.7 g of m-cresol (solid content 10% weight per weight of solvent) containing 0.07 g of isoquinoline (optional) under N$_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 10 ml of m-cresol and then slowly added to 1 liter of vigorously stirred 95% ethanol, and dried under reduced pressure at 150° C. for 24 hours.

Polymer properties: [η] at 30.0° C. in NMP=4.83 dl/g; Tg (TMA)=330° C.; T(−2%)/N$_2$=532° C.; CTE=1.88×10$^{-5}$ 1/° C.; UV data- transparency onset-350 nm and maximum transparency=90%.

EXAMPLE 12

This example illustrates the preparation of a homopolyimide of 2,2'-diphenyl-4,4',5,5'-biphenyltetracarboxylic dianhydride (DPBPDA) and 2,2'-bis(trifluoromethyl)-4,4'-diaminobiphenyl (TFMB).

3.00 millimoles of DPBPDA was added to a stirred solution of 3.00 millimoles of TFMB in 23.0 g of m-cresol (solid content 10% weight per weight of solvent) containing 0.07 g of isoquinoline (optional) under N$_2$ at ambient temperature. After the solution was stirred at 50° C. for 3 hours, it was heated to near 200° C. and maintained at that temperature for 3 hours. During this time, the water of imidization was allowed to distill from the reaction mixture. After the solution was allowed to cool to ambient temperature, it was diluted with 20 ml of m-cresol and then slowly added to 1 liter of vigorously stirred 95% ethanol, and dried under reduced pressure at 150° C. for 24 hours.

Polymer properties: [η] at 30.0° C. in NMP=1.87 dl/g; Tg (TMA)=340° C.; T(−5%)/N$_2$=543° C.; CTE=1.98×10$^{-5}$ 1/° C.

EXAMPLE 13

This example illustrates the preparation of a copolyimide of 2,2'-dibromo-4,4',5,5'-biphenyltetracarboxylic dianhydride (DPBPDA) and 2,2'-bis(trifluoromethyl)-4,4'-diaminobiphenyl (TFMB) and pyromellitic dianhydride (PMDA).

1.389 g (3.07 millimoles) of DBBPDA was added to a stirred solution of 1.968 g (6.15 millimoles) of TFMB in 33.6 g of m-cresol (solid content 10% weight per weight of solvent) containing 0.15 g of isoquinoline (optional)

under N₂ at ambient temperature. After the solution was stirred for 2 hours, it was heated to near 200° C. and maintained at that temperature for 3 hours. During this time, the water of imidization was allowed to distill from the reaction mixture. After the solution was allowed to cool to ambient temperature, 0.278 g (0.614 millimoles) of DBBPDA, 0.536 g (2.458 millimoles) of PMDA, and 8.10 g of m-cresol were added to the oligomer solution. After the mixture was stirred for 2 hours, it was heated to near 200° C. and maintained at that temperature for 3 hours. During this time, the water of imidization was allowed to distill from the reaction mixture. After the solution was allowed to cool to ambient temperature, it was diluted with 20 ml of m-cresol and then slowly added to 1 liter of vigorously stirred 95% ethanol, and dried under reduced pressure at 150° C. for 24 hours.

Polymer properties: [η] at 30.0° C. in NMP=3.12 dl/g.

Polyimides based on the above diphenyl dianhydride have been characterized as follows in Table I.

TABLE I

Polyimides based on DPBPDA

| Diamine | [η] dl/g (NMP @30° C.) | $T_g$ (°C.) TMA @3 MPa | 5% wt. loss (°C. in N₂) |
|---|---|---|---|
| 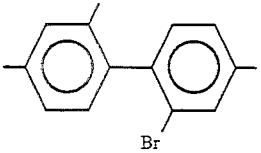 Br / Br | 1.81 | 329 | 532 |
| 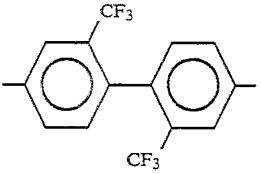 CF₃ / CF₃ | 1.87 | 340 | 543 |

TABLE I-continued

Polyimides based on DPBPDA

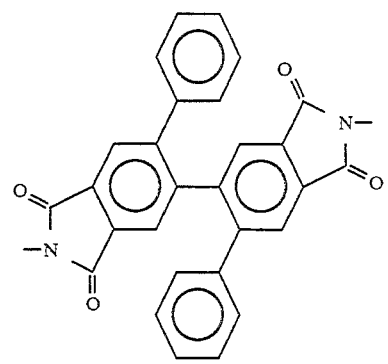

| Diamine | [η] dl/g (NMP @30° C.) | $T_g$ (°C.) TMA @3 MPa | 5% wt. loss (°C. in N₂) |
|---|---|---|---|
| CH₃ / CH₃ | 2.38 | 325 | 542 |

Discussion

What is unexpected about the results is that the solubility of the final polyimide can be significantly enhanced by substitution on the phenyl rings of the dianhydride, particularly when the substitution occurs in the 2 and 2' positions. This is shown in Table I wherein the dianhydride is represented by formula (IV)

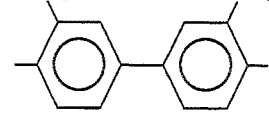

(IV)

wherein m is zero and Z is as defined in Table I, and the diamine is represented formula (X)

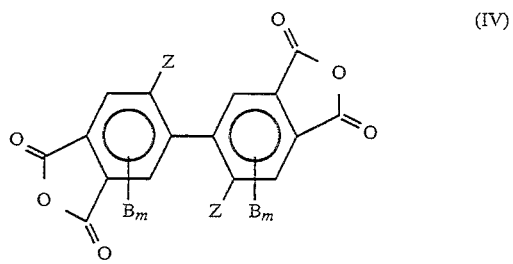

(X)

wherein $B_{1-8}$ are defined as listed in Tables II and III. It is clearly shown that when Z is hydrogen, the solubility of the polyimide is significantly less than when the dianhydride contains a substituent, particularly CF₃.

TABLE II

| | | | | | | | | | Polyimide Solubilities | | | | | |
|---|---|---|---|---|---|---|---|---|---|---|---|---|---|---|
| Z | $B_1$ | $B_2$ | $B_3$ | $B_4$ | $B_5$ | $B_6$ | $B_7$ | $B_8$ | Acetone | THF | DMF | DMSO | DMAc | NMP |
| CF₃ | Cl | — | — | — | Cl | — | — | — | S | S | S | S | S | S |
| CF₃ | Br | — | — | — | Br | — | — | — | S | S | S | S | S | S |
| CF₃ | I | — | — | — | I | — | — | — | S | S | S | S | S | S |

TABLE II-continued

| | | | | | | | | | Polyimide Solubilities | | | | | |
|---|---|---|---|---|---|---|---|---|---|---|---|---|---|---|
| Z | $B_1$ | $B_2$ | $B_3$ | $B_4$ | $B_5$ | $B_6$ | $B_7$ | $B_8$ | Acetone | THF | DMF | DMSO | DMAc | NMP |
| $CF_3$ | $CF_3$ | — | — | — | $CF_3$ | — | — | — | S | S | S | S | S | S |
| $CF_3$ | $CH_3$ | — | — | — | $CH_3$ | — | — | — | I | S | S | S | S | S |
| $CF_3$ | — | $CH_3$ | — | — | — | — | $CH_3$ | — | I | I | I | S | S | S |
| $CF_3$ | $CH_3$ | — | — | Cl | $CH_3$ | — | — | Cl | S | S | S | S | S | S |
| $CF_3$ | Cl | — | OMe | — | Cl | — | OMe | — | S | S | S | S | S | S |
| Ph | Br | — | — | — | Br | — | — | — | I | S | S | S | S | S |
| Ph | $CF_3$ | — | — | — | $CF_3$ | — | — | — | I | S | S | S | S | S |
| Ph | — | $CH_3$ | — | — | — | — | $CH_3$ | — | I | I | I | I | S | S |
| H | — | — | — | — | — | — | — | — | I | I | I | I | I | I |

TABLE III

| | | | | | | | | | | Polyimide Solubilities | | | | | | |
|---|---|---|---|---|---|---|---|---|---|---|---|---|---|---|---|---|
| | Z | $B_1$ | $B_2$ | $B_3$ | $B_4$ | $B_5$ | $B_6$ | $B_7$ | $B_8$ | Acetone | THF | DMF | DMSO | DMAc | NMP | Phenolic solvents |
| 1 | Br | Cl | — | — | — | Cl | — | — | — | I | S | S | S | S | S | S |
| 2 | Br | Br | — | — | — | Br | — | — | — | I | S | S | S | S | S | S |
| 3 | Br | I | — | — | — | I | — | — | — | I | S | S | S | S | S | S |
| 4 | Br | $CF_3$ | — | — | — | $CF_3$ | — | — | — | S | S | S | S | S | S | S |
| 5 | H | $CF_3$ | — | — | — | $CF_3$ | — | — | — | I | I | I | I | I | I | S |
| 6 | Br | $CH_3$ | — | — | — | $CH_3$ | — | — | — | I | S | S | S | S | S | S |
| 7 | Br | — | $CH_3$ | — | — | — | — | $CH_3$ | — | I | I | I | S | S | S | S |
| 8 | Br | $CH_3$ | — | — | Cl | $CH_3$ | — | — | Cl | I | S | S | S | S | S | S |
| 9 | Br | Cl | — | OMe | — | Cl | — | OMe | — | I | S | S | S | S | S | S |
| 10 | H | Cl | — | OMe | — | Cl | — | OMe | — | I | I | I | I | I | I | S |

The significance of the ability to solubilize polyimides by additionally placing substituents in the 2,2' positions on the dianhydride is easily seen by the comparison of the solubility of the polyimide described in row 4 of Table III wherein $B_1 = B_5 = CF_3$ and $Z = Br$. The disubstituted polyimide, in the 2,2' positions of both the diamine and the dianhydride is soluble in solvents such as acetone, THF, DMF, DMSO, DMAc, and NMP. The homolog polyimide, wherein Z is not present, shown in row 5, is soluble only in phenolic solvents.

Additionally, the disubstituted polyimide described in row 9 of Table III, wherein $B_1 = B_5 = Cl$, $B_3 = B_7 = OCH_3$ and $Z = Br$, is soluble in THF, DMF, DMSO, DMAc and NMP. The homolog polyimide, wherein Z is not present, shown in row 10, is insoluble in all organic solvents, except phenolic solvents.

Table IV shows coefficients of thermal expansion (CTE) for various substituted diamine and dianhydride homopolymers and Table V shows UV-transparencies of various polyimides of the invention.

TABLE IV

| | Coefficient of Thermal Expansion (CTE) (1/°C. × $10^{-5}$) | | | | | | | |
|---|---|---|---|---|---|---|---|---|
| | Diamine | | | | | | | |
| Dianhydride | $DCB^4$ | $DBB^5$ | $DIB^6$ | $TFMB^7$ | $DMB^8$ | $OTOL^9$ | $DCM^{10}$ | $DCMO^{11}$ |
| $DBBPDA^1$ | 1.38 | 1.07 | 1.06 | 1.34 | — | 1.20 | 1.28 | 1.18 |
| $DPBPDA^2$ | — | 1.92 | — | 1.98 | — | 2.21 | — | — |
| $TFBPDA^3$ | 1.92 | 1.83 | 1.74 | 1.88 | 1.24 | 1.94 | — | 1.98 |

[1] Formula (IV) with Z = Br
[2] Formula (IV) with Z = phenyl
[3] Formula (IV) with Z = $CF_3$
[4] Formula (X) with $B_1 = B_5 = Cl$
[5] Formula (X) with $B_1 = B_5 = Br$
[6] Formula (X) with $B_1 = B_5 = I$
[7] Formula (X) with $B_1 = B_5 = CF_3$
[8] Formula (X) with $B_1 = B_5 = CH_3$
[9] Formula (X) with $B_2 = B_7 = CH_3$
[10] Formula (X) with $B_1 = B_8 = CH_3$ and $B_4 = B_5 = Cl$
[11] Formula (X) with $B_1 = B_5 = Cl$ and $B_3 = B_7 = OCH_3$

TABLE V

| | UV Transparencies of Polyimides | | | |
|---|---|---|---|---|
| | Transparency | | | |
| | onset (nm) | onset (nm) | 80% (nm) | 80% (nm) |
| | Dianhydride | | | |
| Diamine | $DBBPDA^1$ | $TFBPDA^2$ | $DBBPDA^1$ | $TFBPDA^2$ |
| $DCB^3$ | 336 | 346 | 462 | 428 |
| $DIB^4$ | 338 | 339 | 431 | 426 |
| $TFMB^5$ | 341 | 324 | 403 | 383 |
| $DMB^6$ | 328 | 332 | 424 | 428 |
| $OTOL^7$ | 341 | | 417 | |
| $DCM^8$ | | 335 | | 414 |
| $DCMO^9$ | 345 | 325 | 417 | 400 |

[1] Formula (IV) with Z = Br
[2] Formula (IV) with Z = $CF_3$
[3] Formula (X) with $B_1 = B_5 = Cl$
[4] Formula (X) with $B_1 = B_5 = I$
[5] Formula (X) with B =$CF_3$
[6] Formula (X) with $B_1 = B_5 = CH_3$
[7] Formula (X) with $B_2 = B_7 = CH_3$
[8] Formula (X) with $B_1 = B_8 = CH_3$ and $B_4 = B_5 = Cl$
[9] Formula (X) with $B_1 = B_5 = Cl$ and $B_3 = B_7 = OCH_3$

What is claimed is:

1. A homopolymer polyimide comprising:
(a) an aromatic dianhydride of general formula (IV); and

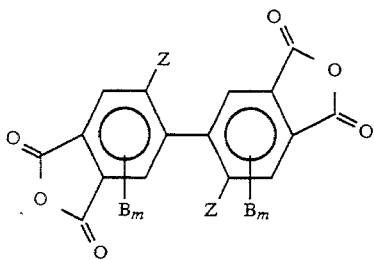

(b) and a polyaromatic diamine of formula (III)

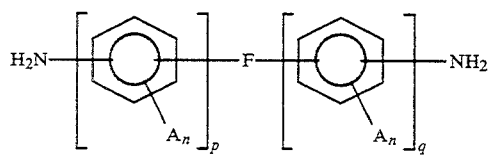

where
- F is selected from the group consisting of a covalent bond, a CH$_2$ group, a C(CH$_3$)$_2$ group, a C(CX$_3$)$_2$ group where X is a halogen, a CO group, an O atom, a S atom, a SO$_2$ group, a Si(R)$_2$ group wherein R is a substituent selected independently from the group consisting of H, phenyl, substituted phenyl, alkyl and substituted alkyl from 1 to 20 carbons, and a N(R) group wherein R is as defined previously;
- B and Z are selected independently from the group consisting of halogens, C$_{1-3}$ alkyls, C$_{1-3}$ halogenated alkyls, phenyl or substituted phenyl wherein the substituents on the phenyl ring include halogens, C$_{1-3}$ alkyls, C$_{1-3}$ halogenated alkyls and combinations thereof;
- m is an integer from 0 to 2;
- A is selected from the group consisting of hydrogen, halogen, alkyl, substituted alkyl, nitro, cyano, thioalkyl, alkoxy, substituted alkoxy, aryl and substituted aryl, aliphatic and aromatic esters and combinations thereof of from 1 to 20 carbons;
- n is an integer from 0 to 4; and
- p and q are integers from 0 to 3 and 1 to 3 respectively, and when p and q are greater than 1, the linking group between benzyl or substituted benzyl groups is F.

2. The polyimide of claim 1 wherein the aromatic dianhydride is selected from the group consisting of 2,2'-dibromo-4,4',5,5'-biphenyltetracarboxylic dianhydride, 2,2'-dichloro-4,4',5,5'-biphenyltetracarboxylic dianhydride, 2,2'-diiodo-4,4',5,5'-biphenyltetracarboxylic dianhydride, 2,2'-difluoro-4,4',5,5'-biphenyltetracarboxylic dianhydride, 2,2'-diphenyl-4,4',5,5'-biphenyltetracarboxylic dianhydride 2,2'-bis(trifluoromethyl)-4,4'-5,5'-biphenyltetracarboxylic dianhydride, 2,2'-bis(trichloromethyl)-4,4'-5,5'-biphenyltetracarboxylic dianhydride, 2,2'-bis(tribromomethyl)-4,4'-5,5'-biphenyltetracarboxylic dianhydride, and 2,2'-bis(triiodomethyl)-4,4'-5,5'-biphenyltetracarboxylic dianhydride.

3. The polyimide of claim 1 wherein the diamine is selected from the group consisting of o-phenylenediamine, m-phenylenediamine, p-phenylenediamine, 2,4-diaminotoluene, 1,4-diamino-2-methoxybenzene, 1,4-diamino-2-phenylbenzene, 1,3-diamino-4-chlorobenzene, 4,4'-diaminobiphenyl, 4,4'-diaminodiphenylmethane, 2,2-bis(4-aminophenyl)propane, 2,2-bis(4-aminophenyl)-1,1,1,3,3,3-hexafluoropropane, 4,4'-diaminodiphenyl ether, 3,4'-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3-hexafluoropropane, 4,4'-diaminodiphenyl thioether, 4,4'-diaminodiphenyl sulfone, 2,2'-diaminobenzophenone, 3,3'-diaminobenzophenone, 1,8-diaminonaphthalene, 1,5-diminonaphthalene, 2,6-diaminopyridine, 2,4-diaminopyrimidine, 2,4-diamino-s-triazine, 2,2'-bis(trifluoromethyl)-4,4'-diaminobiphenyl, 2,2'-dibromo-4,4'-diaminobiphenyl, 2,2'-dicyano-4,4'-diaminobiphenyl, 2,2'-dichloro-6,6'-dimethyl-4,4'-diaminobiphenyl, 2,2'-dimethyl-4,4'-diaminobiphenyl, 3,3'-dimethyl-4,4'-diaminobiphenyl, 2,2'-dicarboalkoxy-4,4'-diaminobiphenyl and 2,2'-dicarboalkoxy-6,6'-dimethyl-4,4'-diaminobiphenyl.

4. A copolyimide comprising:
(a) at least one aromatic dianhydride of general formula (IV); and

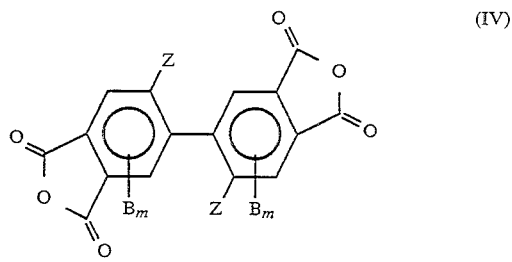

(b) at least two polyaromatic diamines of formula (III)

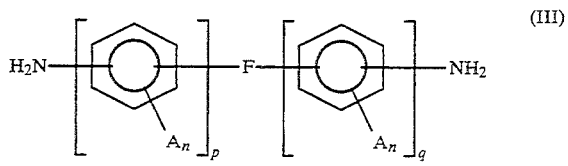

where
- F is a substituent selected independently from the group consisting of a covalent bond, a CH$_2$ group, a C(CH$_3$)$_2$ group, a C(CX$_3$)$_2$ group wherein X is a halogen, a CO group, an O atom, a S atom, a SO$_2$ group, a Si(R)$_2$ group wherein R is a substituent selected from the group consisting of H, phenyl, substituted phenyl, alkyl and substituted alkyl of from 1 to 20 carbons, and a N(R) group wherein R is as defined previously;
- B and Z are selected independently from the group consisting of halogens, C$_{1-3}$ alkyls, C$_{1-3}$ halogenated alkyls, phenyl or substituted phenyl wherein the substituents on the phenyl ring include halogens, C$_{1-3}$ alkyls, C$_{1-3}$ halogenated alkyls and combinations thereof;
- m is an integer from 0 to 2;
- A is selected from the group consisting of hydrogen, halogen, alkyl, substituted alkyl, nitro, cyano, thioalkyl, alkoxy, substituted alkoxy, aryl and substituted aryl, aliphatic and aromatic esters and combinations thereof of from 1 to 20 carbons;
- n is an integer from 0 to 4; and p and q are integers from 0 to 3 and 1 to 3 respectively, and when p and q are greater than 1, the linking group between benzyl or substituted benzyl groups is F; to form a copolyimide of formula (VI)

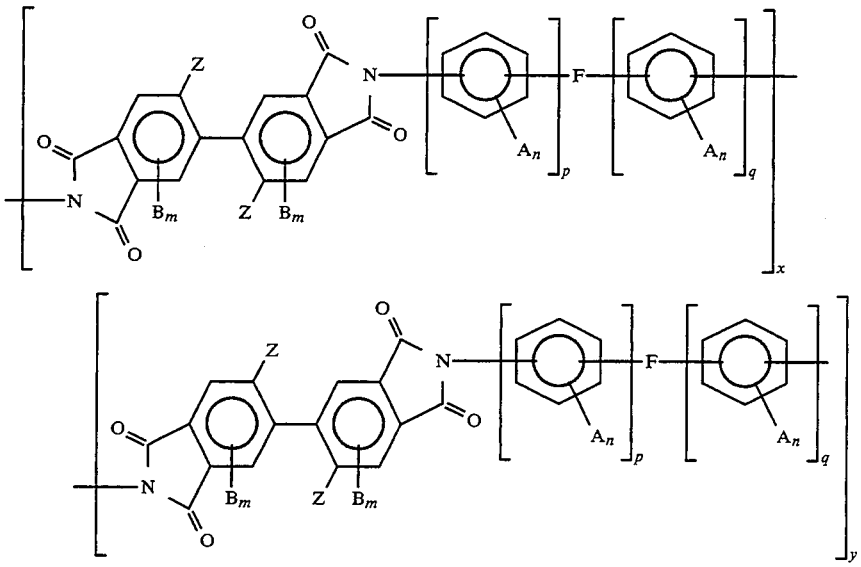

wherein x varies from 99 to 1 mole percent while y varies correspondingly from 1 to 99 mole percent.

5. The copolyimide of claim 4 wherein the aromatic dianhydride is selected from the group consisting of 2,2'-dibromo-4,4',5,5'-biphenyltetracarboxylic dianhydride, 2,2'-dichloro-4,4',5,5'-biphenyltetracarboxylic dianhydride, 2,2'-diiodo-4,4',5,5'-biphenyltetracarboxylic dianhydride, 2,2'-difluoro-4,4',5,5'-biphenyltetracarboxylic dianhydride, 2,2'-diphenyl-4,4',5,5'-biphenyltetracarboxylic dianhydride 2,2'-bis(trifluoromethyl)-4,4'-5,5'-biphenyltetracarboxylic dianhydride, 2,2'-bis(trichloromethyl)-4,4'-5,5'-biphenyltetracarboxylic dianhydride, 2,2'-bis(tribromomethyl)-4,4'-5,5'-biphenyltetracarboxylic dianhydride, and 2,2'-bis(triiodomethyl)-4,4'-5,5'-biphenyltetracarboxylic dianhydride.

6. The copolyimide of claim 4 wherein the diamine is selected from the group consisting of o-phenylenediamine, m-phenylenediamine, p-phenylenediamine, 2,4-diaminotoluene, 1,4-diamino-2-methoxybenzene, 1,4-diamino-2-phenylbenzene, 1,3-diamino-4-chlorobenzene, 4,4'-diaminobiphenyl, 4,4'-diaminodiphenylmethane, 2,2-bis(4-aminophenyl)propane, 2,2-bis(4-aminophenyl)-1,1,1,3,3,3-hexafluoropropane, 4,4'-diaminodiphenyl ether, 3,4'-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]-propane, 2,2-bis[4-(4-aminophenoxy)phenyl]-1,1,1,3,3,3-hexafluoropropane, 4,4'-diaminodiphenyl thioether, 4,4'-diaminodiphenyl sulfone, 2,2'-diaminobenzophenone, 3,3'-diaminobenzophenone, 1,8-diaminonaphthalene, 1,5-diminonaphthalene, 2,6-diaminopyridine, 2,4-diaminopyrimidine, 2,4-diamino-s-triazine, 2,2'-bis(trifluoromethyl)-4,4'-diaminobiphenyl, 2,2'-dibromo-4,4'-diaminobiphenyl, 2,2'-dicyano-4,4'-diaminobiphenyl, 2,2'-dichloro-6,6'-dimethyl-4,4'-diaminobiphenyl, 2,2'-dimethyl-4,4'-diaminobiphenyl, 3,3'-dimethyl-4,4'-diaminobiphenyl, 2,2'-dicarboalkoxy-4,4'-diaminobiphenyl and 2,2'-dicarboalkoxy-6,6'-dimethyl-4,4'-diaminobiphenyl.

7. A copolyimide comprising:
(a) at least one first aromatic dianhydride of general formula (I);

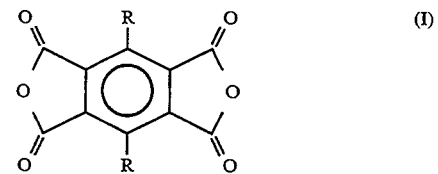

(b) at least one second aromatic dianhydride of formula (XI); and

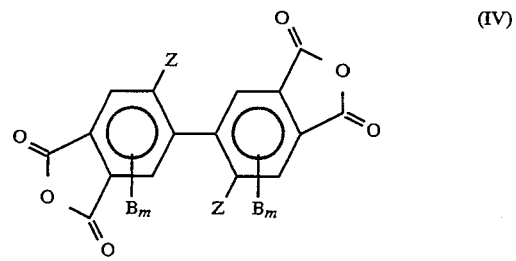

(c) at least one polyaromatic diamine of formula (III)

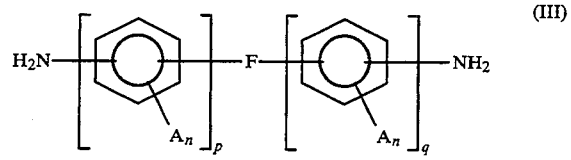

where each
R is a substituent selected independently from the group consisting of H, phenyl, alkyl, halogenated alkyl, and substituted phenyl wherein the substituents on the phenyl ring include halogens, alkyls, C₁₋₃ halogenated alkyls and combinations thereof from 1 to 20 carbons;

F is a substituent selected independently from the group consisting of a covalent bond, a CH$_2$ group, a C(CH$_3$)$_2$ group, a C(CX$_3$)$_2$ group wherein X is a halogen, a CO group, an O atom, a S atom, a SO$_2$ group, a Si(R)$_2$ group wherein R is as defined previously and a N(R) group wherein R is as defined previously;

B and Z are selected independently from the group consisting of halogens, C₁₋₃ alkyls, C₁₋₃ halogenated alkyls, phenyl or substituted phenyl wherein the substituents on the phenyl ring include halogens, C₁₋₃ alkyls, C₁₋₃ halogenated alkyls and combinations thereof;

m is an integer from 0 to 2;

A is selected from the group consisting of hydrogen, halogen, alkyl, substituted alkyl, nitro, cyano, thioalkyl, alkoxy, substituted alkoxy, aryl and substituted aryl, aliphatic and aromatic ester and combinations thereof of from 1 to 20 carbons;

n is an integer from 0 to 4; and p and q are integers from 0 to 3 and 1 to 3 respectively, and when p and q are greater than 1, the linking group between benzyl or substituted benzyl groups is F;

to form a copolyimide of formula (VII)

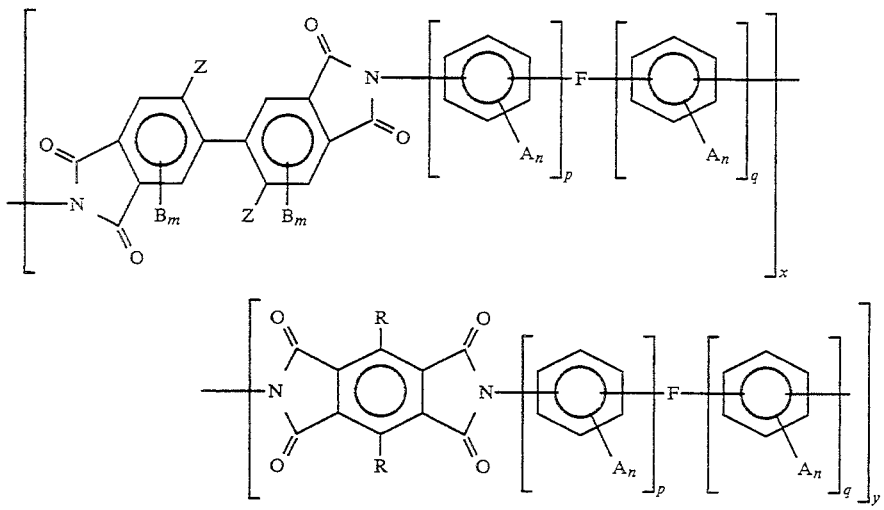

wherein x varies from 99 to 1 mole percent while y varies correspondingly from 1 to 99 mole percent.

8. The copolyimide of claim 7, wherein the dianhydride is selected from the group consisting of pyromellitic dianhydride, 3,6-diphenylpyromellitic dianhydride, 3,6-bis(trifluoromethyl)pyromellitic dianhydride, 3,6-bis(methyl)pyromellitic dianhydride, 3,6-diiodopyromellitic dianhydride, 3,6-dibromopyromellitic dianhydride and 3,6-dichloropyromellitic dianhydride, 2,2′-dibromo-4,4′,5,5′-biphenyl tetracarboxylic dianhydride, 2,2′-dichloro-4,4′,5,5′-biphenyl tetracarboxylic dianhydride, 2,2′-diiodo-4,4′,5,5′-biphenyl tetracarboxylic dianhydride, 2,2′-difluoro-4,4′,5,5′-biphenyl tetracarboxylic dianhydride, 2,2′-diphenyl-4,4′,5,5′-biphenyl tetracarboxylic dianhydride, 2,2′-bis(trifluoromethyl)-4,4′-5,5′-biphenyltetracarboxylic dianhydride, 2,2′-bis(trichloromethyl)-4,4′-5,5′-biphenyltetracarboxylic dianhydride, 2,2′-bis(tribromomethyl)-4,4′-5,5′-biphenyltetracarboxylic dianhydride, and 2,2′-bis(triiodomethyl)-4,4′-5,5′-biphenyltetracarboxylic dianhydride.

9. The copolyimide of claim 7 wherein the diamine is selected from the group consisting of o-phenylenediamine, m-phenylenediamine, p-phenylenediamine, 2,4-diaminotoluene, 1,4-diamino-2-methoxybenzene, 1,4-diamino-2-phenylbenzene, 1,3-diamino-4-chlorobenzene, 4,4′-diaminobiphenyl, 4,4′-diaminodiphenylmethane, 2,2-bis(4-aminophenyl)propane, 2,2-bis(4-aminophenyl)-1,1,1,3,3,3-hexafluoropropane, 4,4′-diaminodiphenyl ether, 3,4′-diaminodiphenyl ether, 1,3-bis(3-aminophenoxy)benzene, 1,3-bis(4-aminophenoxy)benzene, 1,4-bis(4-aminophenoxy)benzene, 4,4′-bis(4-aminophenoxy)biphenyl, 4,4′-bis(3-aminophenoxy)biphenyl, 2,2-bis[4-(4-aminophenoxy)phenyl]propane, 2,2-bis[4-(4-aminophenoxy)phenyl]-1,1,1,3,3,3-hexafluoropropane, 4,4′-diaminodiphenyl thioether, 4,4′-diaminodiphenyl sulfone, 2,2′-diaminobenzophenone, 3,3′-diaminobenzophenone, 1,8-diaminonaphthalene, 1,5-diminonaphthalene, 2,6-diaminopyridine, 2,4-diaminopyrimidine, 2,4-diamino-s-triazine, 2,2′-bis(trifluoromethyl)-4,4′-diaminobiphenyl, 2,2′-dibromo-4,4′-diaminobiphenyl, 2,2′-dicyano-4,4′-diaminobiphenyl, 2,2′-dichloro-6,6′-dimethyl-4,4′-diaminobiphenyl, 2,2′-dimethyl-4,4′-diaminobiphenyl, 3,3′-dimethyl-4,4′-diaminobiphenyl, 2,2′-dicarboalkoxy-4,4′-diaminobiphenyl and 2,2′-dicarboalkoxy-6,6′-dimethyl-4,4′-diaminobiphenyl.

10. A copolyimide comprising:
(a) at least one first aromatic dianhydride of general formula (II);

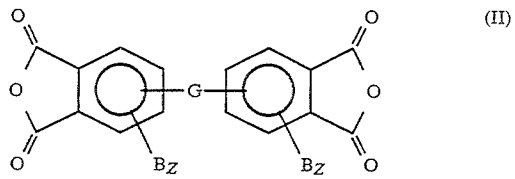

(b) at least one second aromatic dianhydride of formula (IV); and n is an integer from 0 to 4; and p and q are integers from 0 to 3 and 1 to 3 respectively, and when p and q are greater than 1, the linking group between benzyl or substituted benzyl groups is F;

to form a copolyimide of formula (VIII)

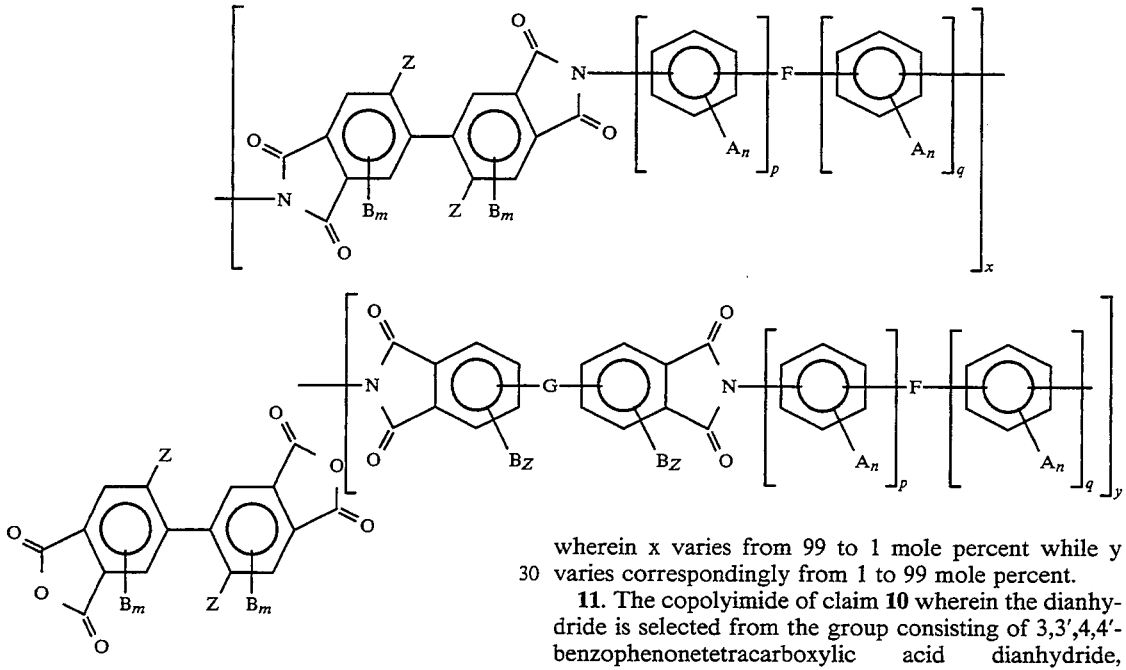

(c) at least one polyaromatic diamine of formula (III)

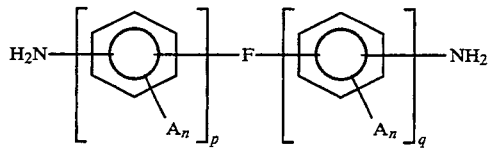

where each

R is a substituent selected independently from the group consisting of H, phenyl, substituted phenyl, alkyl and substituted alkyl from 1 to 20 carbons;

F and G are substituents selected independently from the group consisting of a covalent bond, a $CH_2$ group, a $C(CH_3)_2$ group, a $C(CX_3)_2$ group wherein X is a halogen, a CO group, an O atom, a S atom, a $SO_2$ group, a $Si(R)_2$ group wherein R is as defined previously and a N(R) group wherein R is as defined previously;

B and Z are selected independently from the group consisting of halogens, $C_{1-3}$ alkyls, $C_{1-3}$ halogenated alkyls, phenyl or substituted phenyl wherein the substituents on the phenyl ring include halogens, $C_{1-3}$ alkyls, $C_{1-3}$ halogenated alkyls and combinations thereof;

m is an integer from 0 to 2;

n is an integer from 0 to 3;

A is selected from the group consisting of hydrogen, halogen, alkyl, substituted alkyl, nitro, cyano, thioalkyl, alkoxy, substituted alkoxy, aryl and substituted aryl, aliphatic and aromatic ester and combinations thereof of from 1 to 20 carbons;

wherein x varies from 99 to 1 mole percent while y varies correspondingly from 1 to 99 mole percent.

11. The copolyimide of claim 10 wherein the dianhydride is selected from the group consisting of 3,3',4,4'-benzophenonetetracarboxylic acid dianhydride, 2,3,3',4'-benzophenonetetracarboxylic acid dianhydride, 2,2',3,3'-benzophenone tetracarboxylic acid dianhydride, 3,3',4,4'-biphenyltetracarboxylic acid dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)propane dianhydride, 2,2-bis(3,4-dicarboxyphenyl)- 1,1,1,3,3,3-hexafluoropropane dianhydride, bis(3,4-dicarboxyphenyl)ether dianhydride, bis(3,4-dicarboxyphenyl)sulfone dianhydride, 4,4',4,4'-isopropylidene-di(p-phenyleneoxy)]-bis(phthalic anhydride), N,N-(3,4-dicarboxyphenyl)-N-methylamine dianhydride, bis(3,4-dicarboxyphenyl)diethylsilane dianhydride, 2,3,6,7-naphthalene-tetracarboxylic acid dianhydride, 1,2,5,6-naphthalene-tetracarboxylic acid dianhydride, 2,6-dichloronaphthalene-1,4,5,8-tetracarboxylic acid dianhydride, thiophene-2,3,4,5-tetracarboxylic acid dianhydride, pyrazine-2,3,5,6-tetracarboxylic acid dianhydride, pyridine-2,3,5,6-tetracarboxylic acid dianhydride, 2,2'-dibromo-4,4',5,5'-biphenyl tetracarboxylic dianhydride, 2,2'-dichloro-4,4',5,5'-biphenyl tetracarboxylic dianhydride, 2,2'-diiodo-4,4',5,5'-biphenyl tetracarboxylic dianhydride, 2,2'-difluoro-4,4',5,5'-biphenyl tetracarboxylic dianhydride, 2,2'-diphenyl-4,4',5,5'-biphenyl tetracarboxylic dianhydride, 2,2'-bis(trifluoromethyl)-4,4'-5,5'-biphenyltetracarboxylic dianhydride, 2,2'-bis(trichloromethyl)-4,4'-5,5'-biphenyltetracarboxylic dianhydride, 2,2'-bis(tribromomethyl)-4,4'-5,5'-biphenyltetracarboxylic dianhydride, and 2,2'-bis(triiodomethyl)-4,4'-5,5'-biphenyltetracarboxylic dianhydride.

12. The copolyimide of claim 10 wherein the diamine is selected from the group consisting of o-phenylenediamine, m-phenylenediamine, p-phenylenediamine, 2,4-diaminotoluene, 1,4-diamino-2-methoxybenzene, 1,4-diamino-2-phenylbenzene, 1,3-diamino-4-chlorobenzene, 4,4'-diaminobiphenyl, 4,4'-diaminodiphenylmethane, 2,2-bis(4-aminophenyl)propane, 2,2-bis(4-aminophenyl)-1,1,1,3,3,3-hexafluoropropane, 4,4'-diaminodiphenyl ether, 3,4'-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]-propane, 2,2-bis[4-(4-aminophenoxy)phenyl]-1,1,1,3,3,3-hexafluoropropane, 4,4'-diaminodiphenyl thioether, 4,4'-diaminodiphenyl sulfone, 2,2'-diaminobenzophenone, 3,3'-diaminobenzophenone, 1,8-diaminonaphthalene, 1,5-diminonaphthalene, 2,6-diaminopyridine, 2,4-diaminopyrimidine, 2,4-diamino-s-triazine, 2,2'-bis(trifluoromethyl)-4,4'-diaminobiphenyl, 2,2'-dibromo-4,4'-diaminobiphenyl, 2,2'-dicyano-4,4'-diaminobiphenyl, 2,2'-dichloro-6,6'-dimethyl-4,4'-diaminobiphenyl, 2,2'-dimethyl-4,4'-diaminobiphenyl, 3,3'-dimethyl-4,4'-diaminobiphenyl, 2,2'-dicarboalkoxy-4,4'-diaminobiphenyl and 2,2'-dicarboalkoxy-6,6'-dimethyl-4,4'-diaminobiphenyl.

13. An aromatic dianhydride of general formula (IV)

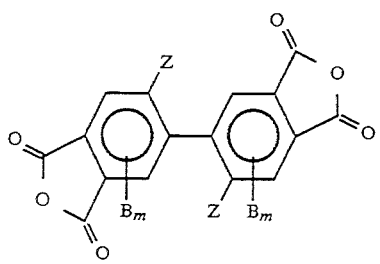

where
B and Z are selected independently from the group consisting of halogens, $C_{1-3}$ alkyls, $C_{1-3}$ halogenated alkyls, phenyl or substituted phenyl wherein the substituents on the phenyl ring include halogens, $C_{1-3}$ alkyls, $C_{1-3}$ halogenated alkyls and combinations thereof;
m is an integer from 0 to 2.

14. The dianhydride of claim 13 wherein the aromatic dianhydride is selected from the group consisting of 2,2'-dibromo-4,4',5,5'-biphenyl tetracarboxylic dianhydride, 2,2'-dichloro-4,4',5,5'-biphenyl tetracarboxylic dianhydride, 2,2'-diiodo-4,4',5,5'-biphenyl tetracarboxylic dianhydride, 2,2'-difluoro-4,4',5,5'-biphenyl tetracarboxylic dianhydride, 2,2'-diphenyl-4,4',5,5'-biphenyl tetracarboxylic dianhydride, 2,2'-bis(trifluoromethyl)-4,4'-5,5'-biphenyltetracarboxylic dianhydride, 2,2'-bis(trichloromethyl)-4,4'-5,5'-biphenyltetracarboxylic dianhydride, 2,2'-bis(tribromomethyl)-4,4'-5,5'-biphenyltetracarboxylic dianhydride, and 2,2'-bis(triiodomethyl)-4,4'-5,5'-biphenyltetracarboxylic dianhydride.

15. The dianhydride of claim 14 wherein the aromatic dianhydride is selected from the group consisting of 2,2'-dibromo-4,4',5,5'-biphenyl tetracarboxylic dianhydride, 2,2'-dichloro-4,4',5,5'-biphenyl tetracarboxylic dianhydride, 2,2'-diphenyl-4,4',5,5'-biphenyl tetracarboxylic dianhydride and 2,2'-bis(trifluoromethyl)-4,4'-5,5'-biphenyltetracarboxylic dianhydride.

16. A copolyimide comprising:
(a) at least two aromatic dianhydrides of general formula (IV); and

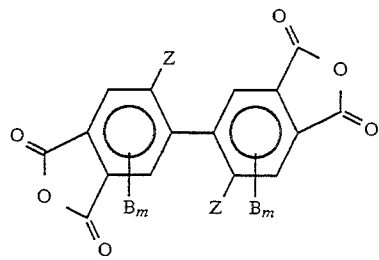

(b) at least one polyaromatic diamine of formula (III)

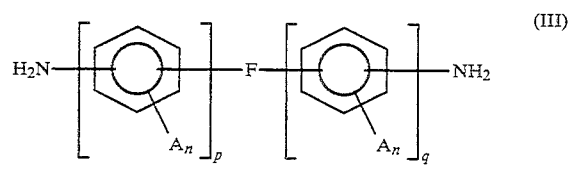

where
F is a substituent selected independently from the group consisting of a covalent bond, a $CH_2$ group, a $C(CH_3)_2$ group, a $C(CX_3)_2$ group wherein X is a halogen, a CO group, an O atom, a S atom, a $SO_2$ group, a $Si(R)_2$ group wherein R is a substituent selected from the group consisting of H, phenyl, substituted phenyl, alkyl and substituted alkyl of from 1 to 20 carbons, and a N(R) group wherein R is as defined previously;
B and Z are selected independently from the group consisting of halogens, $C_{1-3}$ alkyls, $C_{1-3}$ halogenated alkyls, phenyl or substituted phenyl wherein the substituents on the phenyl ring include halogens, $C_{1-3}$ alkyls, $C_{1-3}$ halogenated alkyls and combinations thereof;
m is an integer from 0 to 2;
is selected from the group consisting of hydrogen, halogen, alkyl, substituted alkyl, nitro, cyano, thioalkyl, alkoxy, substituted alkoxy, aryl and substituted aryl, aliphatic and aromatic esters and combinations thereof of from 1 to 20 carbons;
n is an integer from 0 to 4; and
p and q are integers from 0 to 3 and 1 to 3 respectively, and when p and q are greater than 1, the linking group between benzyl or substituted benzyl groups is F;
to form a copolyimide of formula (VI)

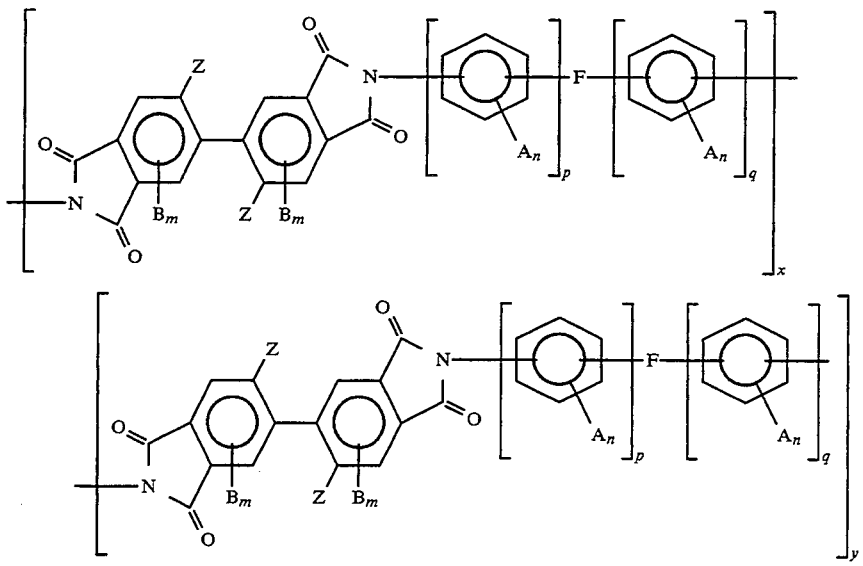

wherein x varies from 99 to 1 mole percent while y varies correspondingly from 1 to 99 mole percent.

17. The copolyimide of claim 16 wherein the aromatic dianhydride is selected from the group consisting of 2,2'-dibromo-4,4',5,5'-biphenyltetracarboxylic dianhydride, 2,2'-dichloro-4,4',5,5'-biphenyltetracarboxylic dianhydride, 2,2'-diiodo-4,4',5,5'-biphenyltetracarboxylic dianhydride, 2,2'-difluoro-4,4',5,5'-biphenyltetracarboxylic dianhydride, 2,2'-diphenyl-4,4',5,5'-biphenyltetracarboxylic dianhydride 2,2'-bis(trifluoromethyl)-4,4'-5,5'-biphenyltetracarboxylic dianhydride, 2,2'-bis(trichloromethyl)-4,4'-5,5'-biphenyltetracarboxylic dianhydride, 2,2'-bis(tribromomethyl)-4,4'-5,5'-biphenyltetracarboxylic dianhydride, and 2,2'-bis(triiodomethyl)-4,4'-5,5'-biphenyltetracarboxylic dianhydride.

18. The copolyimide of claim 16 wherein the diamine is selected from the group consisting of o-phenylenediamine, m-phenylenediamine, p-phenylenediamine, 2,4-diaminotoluene, 1,4-diamino-2-methoxybenzene, 1,4-diamino-2-phenylbenzene, 1,3-diamino-4-chlorobenzene, 4,4'-diaminobiphenyl, 4,4'-diaminodiphenylmethane, 2,2-bis(4-aminophenyl)propane, 2,2-bis(4-aminophenyl)-1,1,1,3,3,3-hexafluoropropane, 4,4'-diaminodiphenyl ether, 3,4'-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3-hexafluoropropane, 4,4'-diaminodiphenyl thioether, 4,4'-diaminodiphenyl sulfone, 2,2'-diaminobenzophenone, 3,3'-diaminobenzophenone, 1,8-diaminonaphthalene, 1,5-diminonaphthalene, 2,6-diaminopyridine, 2,4-diaminopyrimidine, 2,4-diamino-s-triazine, 2,2'-bis(trifluoromethyl)-4,4'-diaminobiphenyl, 2,2'-dibromo-4,4'-diaminobiphenyl, 2,2'-dicyano-4,4'-diaminobiphenyl, 2,2'-dichloro-6,6'-dimethyl-4,4'-diaminobiphenyl, 2,2'-dimethyl-4,4'-diaminobiphenyl, 3,3'-dimethyl-4,4'-diaminobiphenyl, 2,2'-dicarboalkoxy-4,4'-diaminobiphenyl and 2,2'-dicarboalkoxy-6,6'-dimethyl-4,4'-diaminobiphenyl.

* * * * *

UNITED STATES PATENT AND TRADEMARK OFFICE
CERTIFICATE OF CORRECTION

PATENT NO. : 5,395,918
DATED : March 7, 1995
INVENTOR(S) : FRANK W. HARRIS and SHENG-HSIEN LIN It is certified that error appears in the above-indentified patent and that said Letters Patent is hereby corrected as shown below:

Column 1 line 3:
After the Title and before the Technical Field of the Invention should read --This invention was made with government support under DMR 91-57738 and DMR 89-20147 awarded by the National Science Foundation, and under NAG 1-448 awarded by NASA. The Government has certain rights in this invention.--

Signed and Sealed this

Eighth Day of October, 1996

Attest:

BRUCE LEHMAN

Attesting Officer

Commissioner of Patents and Trademarks